(12) United States Patent
Harrison, III et al.

(10) Patent No.: US 7,287,801 B2
(45) Date of Patent: Oct. 30, 2007

(54) CONVERTIBLE TOP MECHANISM WITH INWARDLY ARTICULATING REARMOST LATERAL RAILS

(76) Inventors: Albert W. Harrison, III, 18430 Fairway Dr., Detroit, MI (US) 48221; David Wayne Brooks, 11682 Spicer Dr., Plymouth, MI (US) 48170; Joseph Frank, 254 Keegan St., Deerfield, MI (US) 49238

( * ) Notice: Subject to any disclaimer, the term of this patent is extended or adjusted under 35 U.S.C. 154(b) by 112 days.

(21) Appl. No.: 11/114,928

(22) Filed: Apr. 26, 2005

(65) Prior Publication Data
US 2006/0237990 A1    Oct. 26, 2006

(51) Int. Cl.
*B60J 7/12* (2006.01)
(52) U.S. Cl. .................. 296/107.09; 296/121; 296/122
(58) Field of Classification Search ........... 296/107.09, 296/107.01, 121, 122
See application file for complete search history.

(56) References Cited

U.S. PATENT DOCUMENTS

| | | | | |
|---|---|---|---|---|
| 2,768,857 A * | 10/1956 | Albrecht | ..................... | 296/117 |
| 2,860,913 A * | 11/1958 | Kuiper et al. | .......... | 296/107.09 |
| 4,720,134 A * | 1/1988 | Seifert | ....................... | 296/118 |
| 4,840,421 A | 6/1989 | Hennessy | ................... | 296/122 |
| 4,958,882 A * | 9/1990 | Kolb | ........................... | 296/108 |
| 5,004,291 A * | 4/1991 | Bauer et al. | ................. | 296/116 |
| 5,106,145 A | 4/1992 | Corder | ........................ | 296/107 |
| 5,118,158 A | 6/1992 | Truskolaski | ................. | 296/107 |
| 5,161,852 A | 11/1992 | Alexander et al. | .......... | 296/108 |
| 5,779,299 A | 7/1998 | Purcell et al. | .............. | 296/121 |
| 5,868,454 A | 2/1999 | Homann et al. | ............. | 296/128 |
| 6,019,416 A * | 2/2000 | Beierl | .................... | 296/107.17 |
| 6,416,111 B1 | 7/2002 | Neubrand | .............. | 296/107.09 |
| 6,464,284 B2 | 10/2002 | Neubrand | .............. | 296/107.01 |
| 6,478,362 B2 | 11/2002 | Obendiek | ................... | 296/108 |
| 6,550,842 B1 | 4/2003 | Halbweiss et al. | .......... | 296/116 |
| 6,623,065 B2 * | 9/2003 | Halbweiss et al. | .......... | 296/122 |
| 6,666,494 B2 | 12/2003 | Antreich | ................. | 296/107.01 |
| 6,692,061 B1 | 2/2004 | Willard | ...................... | 296/116 |
| 6,695,385 B1 | 2/2004 | Lange | .................... | 296/107.12 |
| 6,802,554 B1 | 10/2004 | Just et al. | .............. | 296/107.09 |
| 2006/0061129 A1 * | 3/2006 | Dilluvio | ................ | 296/107.09 |

\* cited by examiner

*Primary Examiner*—Dennis H. Pedder
*Assistant Examiner*—Mike Hernandez (57) ABSTRACT

A three-dimensional four bar linkage mechanism is described which provides in and out movement of the rear corners of a convertible top as the top is being lowered or extended which allows the storage space for the retracted top to be smaller in width than the width of the foot print of the top when extended. A drag link which is hinged at one end to one bar and connected by a ball joint to a second bar which in turn is obliquely hinged to a third bar provides the three-dimensional action.

9 Claims, 14 Drawing Sheets

CONVERTIBLE TOP MECHANISM WITH INWARDLY ARTICULATING REARMOST LATERAL RAILS

FIELD OF INVENTION

This invention is directed at convertible roof systems for motor vehicles wherein the rearmost lateral rails of the top stack may be articulated inwardly to allow the top to be wider than the body cavity or passenger space of the vehicle. More specifically, by employing a three-dimensional, four bar linkage including a ball joint, the outer lateral rear side rails may be rotated inward or outward when the convertible top is lowered or raised, respectively, improving packaging flexibility.

BACKGROUND OF THE INVENTION

While rigid hardtops comprise the roof system for most motor vehicles, there is a continuing demand for retractable tops, both soft and hard, for sportier "convertible" versions. Generally, the annual volume requirements for convertibles are low and the structural requirements are different enough from the standard rigid hardtop model that a special off-line or modular production facility is employed for build-up and assembly of convertible options. Different attachment points for the various types of roofs are usually required as well as hinging or sliding mechanisms for retracting the convertible top. A portion of the trunk of the vehicle is usually employed to store the retracted top in its collapsed form.

Roof systems for most vehicles are rigid metal sections, which are welded in place and provide a portion of the structural integrity of the vehicle. It is also common in the automobile industry to employ fabric covered soft top convertible roofs or retractable hardtop convertible roofs, which are movable from an extended position above a passenger compartment to a retracted position near the vehicle trunk. The traditional retractable hardtop roof system employs a plurality of rigid roof panels, which can slide or be hinged and retracted for storage into the rear passenger compartment or trunk of the vehicle. A more popular convertible roof system comprises a fabric-covered frame or topstack which can fold and retract in a like manner taking up much less space when stored in the vehicle.

Packaging space in passenger vehicles is at a premium today, especially considering all the options (side air bags, consoles, etc.) and creature features (telematics, luggage storage, telephones, CD players, etc.) being offered. With a convertible top, space must be provided to store the collapsed top in the vicinity of the vehicle trunk. The concern over space to store the retracted soft top affects the size, or footprint, as well as the styling of the top when it is extended over the passenger compartment of the vehicle.

Convertible tops are supported by and moved by a topstack linkage, the linkage including a plurality of bows, extending transversely across the vehicle that are joined on opposite lateral left and right sides by rail linkages that are extended, longitudinally, when the top is in the full up position, covering the passenger space. The rail linkages are folded back onto themselves when the top is retracted into a full down or stowed position. This longitudinal displacement requires that the footprint of the extended top be the same width as the body cavity, in the area of the rear seat or trunk, in which the top will be stowed.

Some art exists which is directed at improved sealing of convertible tops in the area of the side windows. U.S. Pat. No. 6,550,842, assigned to CTS Fahrzeug Dachsysteme GmbH, is directed at the use of a side bar comprised of two limbs, which form a single-part component, which undergo rotational movement when the top is extended to improve the seal of the convertible top in the region of the side windows.

U.S. Pat. No. 6,416,111, also assigned to CTS, is directed at a cross-folding convertible top wherein the transversely extending bows fold to allow the longitudinal side rails to pivot inwardly and upon extension allow the use of a one-piece seal to address water leakage problems.

U.S. Pat. No. 5,106,145, assigned to ASC Incorporated, is directed at a member coupled to a convertible top linkage and displaced by a camming means to tension the convertible top fabric cover.

Another patent, U.S. Pat. No. 6,695,385, also assigned to ASC Incorporated, is directed at a roof bow that is activated by a link that travels along a camming surface when the top is activated, to vary the tension of the roof cover.

U.S. Pat. No. 6,666,494, assigned to Webasto Vehicle Systems International GmbH, is directed at a folding convertible top which includes the front end of a seal bearer which swings outward via connecting rods in a transverse fashion when the top is lowered so that the seal bearer can be deposited next to the seat to allow a greater car seat width.

What is needed is a mechanism which allows a convertible top when retracted to be smaller in width that when extended over the passenger compartment.

What is further needed is to accomplish this difference in top width while providing styling, function and packaging flexibility without the complex mechanism of slides, cables or springs to control the lateral motion.

It is an object of the present invention to provide an articulating mechanism integrated into a normal convertible top framework which allows the top to have a wider footprint when extended than when retracted into a stowed position.

It is a further object of the present invention to provide a three-dimensional four bar linkage which does not require slides, cables or springs to drag the outer lateral rear side rail links inward when the top is retracted.

It is a further object of the present invention to make it possible to provide convertible tops that are significantly wider than the storage space in the bodies into which they fit for stowage.

SUMMARY OF THE INVENTION

A unique inwardly articulating linkage mechanism is provided which may be integrated into a normal fabric covered convertible top framework to provide in and out displacement of the outer lateral rear side rails thereby accomplishing the object of providing a wider top footprint than the space in which the retracted top is stowed in.

The mechanism comprises a three-dimensional, four bar linkage including an outer lateral rear side rail to which a rear seal and top cover are attached and which is preferably hinged obliquely to an outer lateral forward side rail. The outer lateral rear side rail is, in turn, secured by a ball joint to a drag link which controls the in and out displacement of the outer lateral rear side rail. The drag link is, in turn, secured to a front articulated support rod of the topstack mechanism, preferably by a hinge joint operating at about 90° to the axis of rotation of the oblique hinge, which is in turn attached back to the outer lateral forward side rail by a hinge point operating normal to the center axis of the vehicle. The action of this mechanism when the convertible top is lowered allows the effective width of the top to be substantially reduced to fit within a smaller (widthwise) packaging space. Conversely, on extending the top over the passenger space of the vehicle, the outer lateral rear side rails may be displaced outwardly to provide enhanced styling, functionality and packaging. Further, the mechanism may be integrated into a topstack having any shape of rear rail and applied to any roof regardless of size without degradation of function due to the unique construction of the mechanism.

DETAILED DESCRIPTION OF THE PREFERRED EMBODIMENTS

Figure 1:
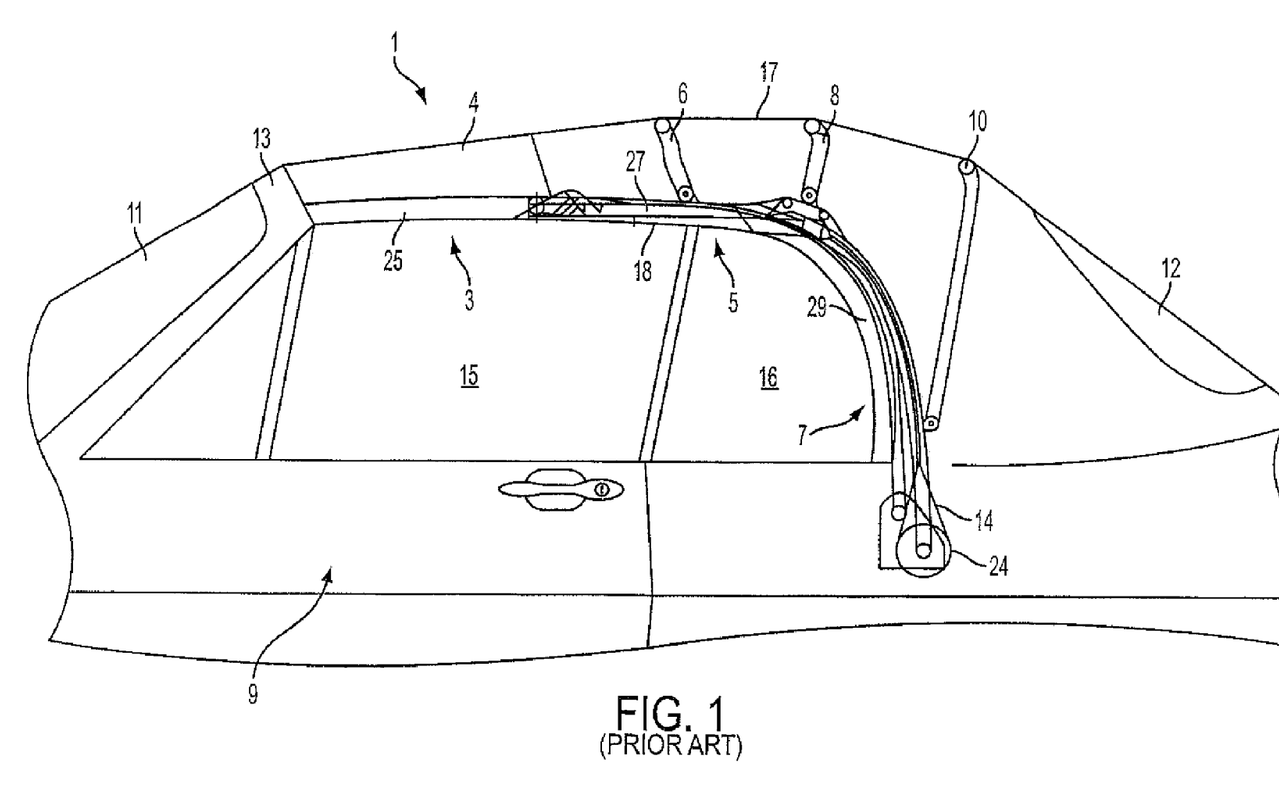
FIG. 1 is a schematic lateral view of a convertible equipped with a motor vehicle covering system of the prior art, wherein a cover is stretched over the three roof sections in a closed position of the covering system.
Figure 2:
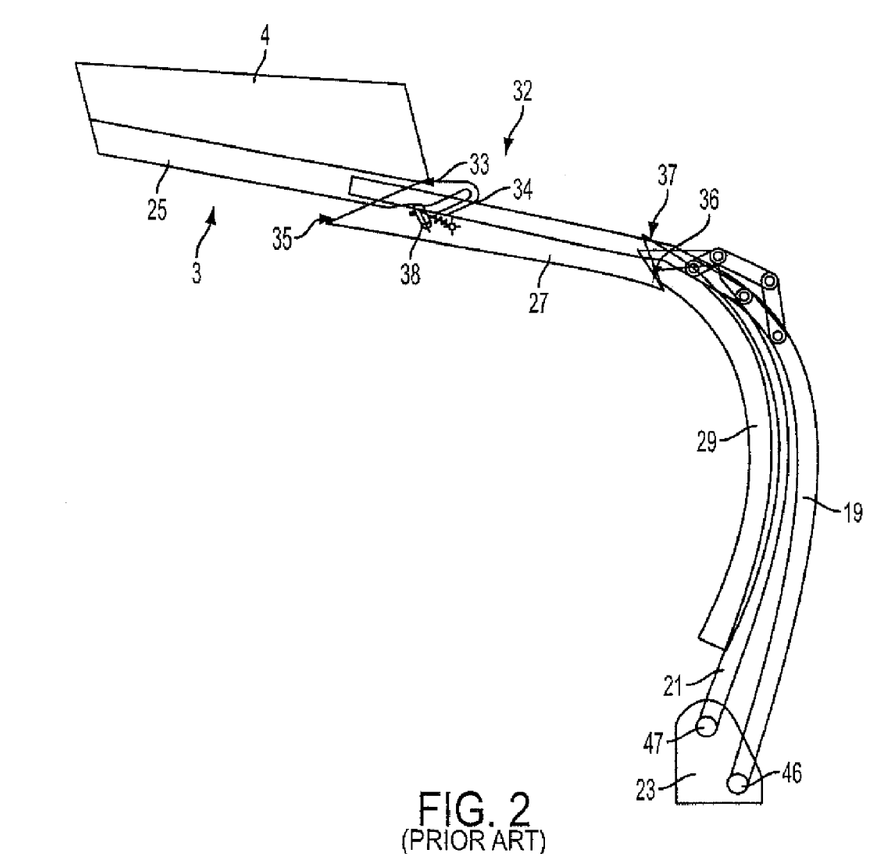
FIGS. 2 to 4 are schematic lateral views of the supporting elements of the three roof sections of the motor vehicle covering system according to FIG. 1 during successive stages of the opening process.

A prior art motor vehicle covering system 1 is described below with reference to the figures as an exemplary application. Identical elements are assigned with the same reference numbers in each drawing. For reasons of simplification and clarification, the drawings only show one side of the motor vehicle covering system. The correspondingly equipped other half of the system, a mirror image of the system described below, is located on the other side of the vehicle FIG. 1 shows a schematic lateral view of a motor vehicle covering system according to the prior art. The motor vehicle covering system 1 is installed in a convertible 9, which has a front side window 15 and a rear side window 16. The convertible 9 comprises a windshield 11 whose upper edge is framed by an apron 13. The motor vehicle covering system 1 comprises three roof sections, a first, front roof section 3, a second, central roof section 5 and a third, rear roof section 7, which are contiguous to each other in the closed position of the covering system 1, as shown in FIG. 1. It further comprises a fabric cover 17 that extends over the whole length of the roof.

Each of the roof sections 3, 5, 7 comprises a supporting frame element (or side rail linkage) 25, 27, 29 at each lateral side thereof that is equipped with suitable gaskets. The supporting frame element 25 of the first, front roof section 3 seals and supports the cover 17 along the front side window 15. The supporting frame element 27 of the second, central roof section 5 provides the same function to side windows 15 and 16, while the supporting frame element 29 of the third, rear roof section 7 suitably conforms to the contour of the rear side window 16. Between the two opposing side rail linkages 25, 27, 29 of each roof section 3, 5, 7 a stable transverse connection is provided resulting in a better resistance of the covering system. The first, front roof section 3 comprises a hard top shell 4 connecting the two supporting side rails 25 and providing high stability of this segment. When the convertible top is extended, the hard top shell 4 is connected to the apron 13 in a sealing manner as known in the state of the art. The second, central roof section 5 comprises a transverse roof arch (or bow) 6 that links the two supporting frame elements 27, and the third, rear roof section 7 comprises two transverse roof arches (or bows) 8, 10 to link the opposing support rods (described below) of the third roof section 7. All transverse bows 6, 8, 10 are preferably built from aluminum and are convex or substantially U-shaped with a central transverse section and two articulated end sections. The end sections are linked to the side rails 27, 29 or support rods via standard pivot mechanisms not described further. Depending on the size of the vehicle 9, more or less transverse bows may be needed to support the stretched fabric cover 17.

The cover 17 is fixed at the hardtop shell 4, preferably by use of an adherent, and is stretched over the transverse roof bows 6, 8, 10 towards the tail of the vehicle. The transverse roof bows 6, 8, 10 are fixed to the cover 17 in any suitable manner, i.e. via sewing. The cover 17 can comprise a plastic rear window 12 in the region of the third roof section 7.

FIGS. 2 to 5 show the relevant elements of the opening device in schematic lateral views during successive steps of the opening process. As can be seen from the figures, the third, rear roof section 7 features two articulated support rods 19 and 21. Their lower ends 20 and 22 are hinged to a bearing 23 via two pivots 46, 47, while their upper sections curve in the direction of the front of the vehicle. The pivot 47 of the front rod 21 is arranged higher than the pivot 46 of the rear rod 19 (see FIG. 3).

The side rail 25 of the first, front roof section 3 comprises a connection surface 33 that is angled and engages with a reciprocally angled connection surface 35 of the side rail 27 of the second, central roof section 5. Due to this arrangement, the first, front roof section 3 can easily be lifted over the second, central roof section 5. On its back end, the side rail 27 of the second, central roof section 5 comprises a connection surface 36, which is angled in the other direction and combines with a connection surface 37 of the rear side rail 29 of the third, rear roof section 7. In alternate topstack configurations, the side rail frame elements may hinge and collapse upon one another rather than lifting and sliding.

Figure 3:
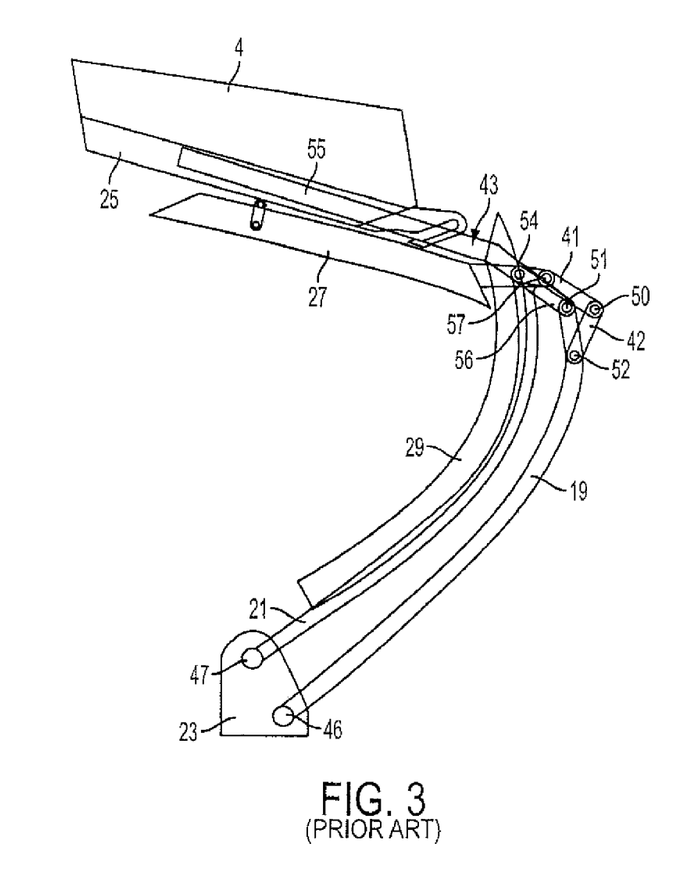
Figure 4:
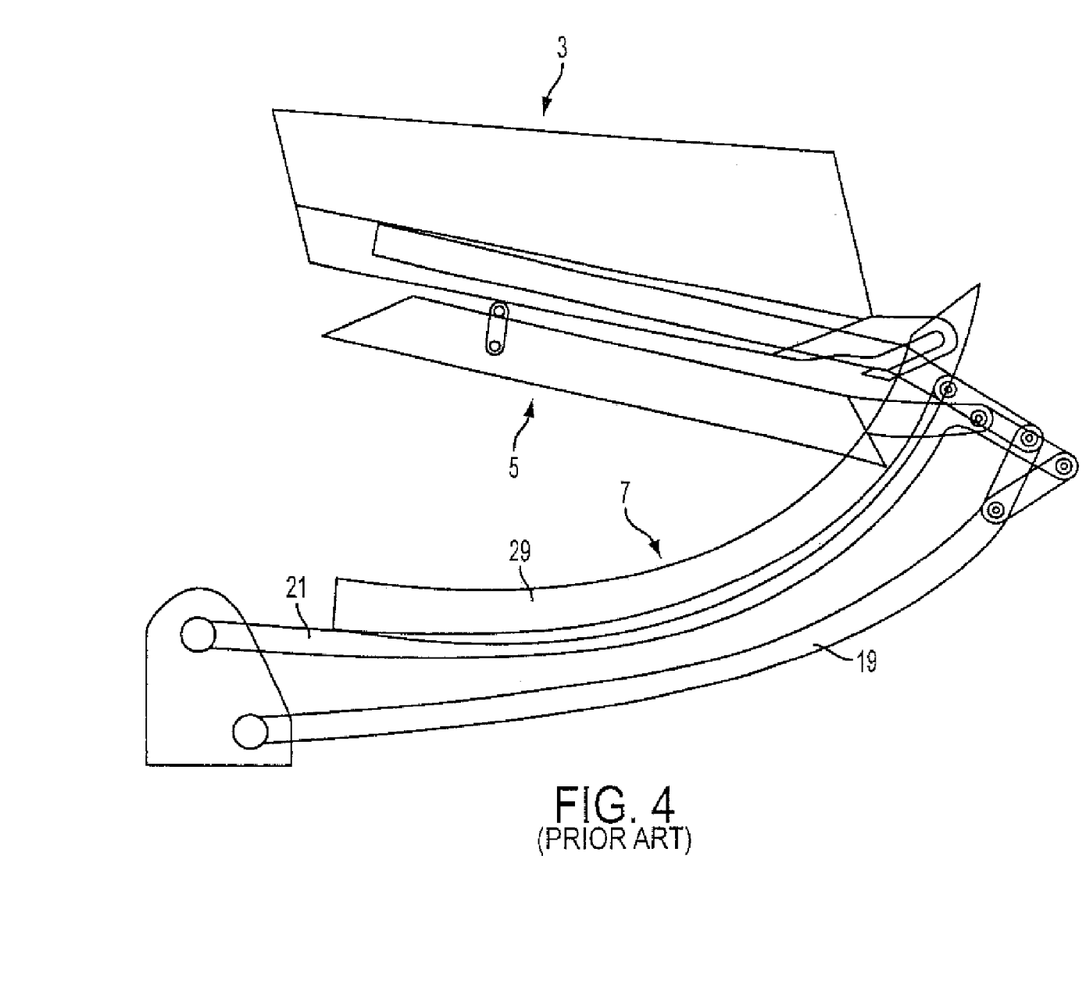
Figure 5:
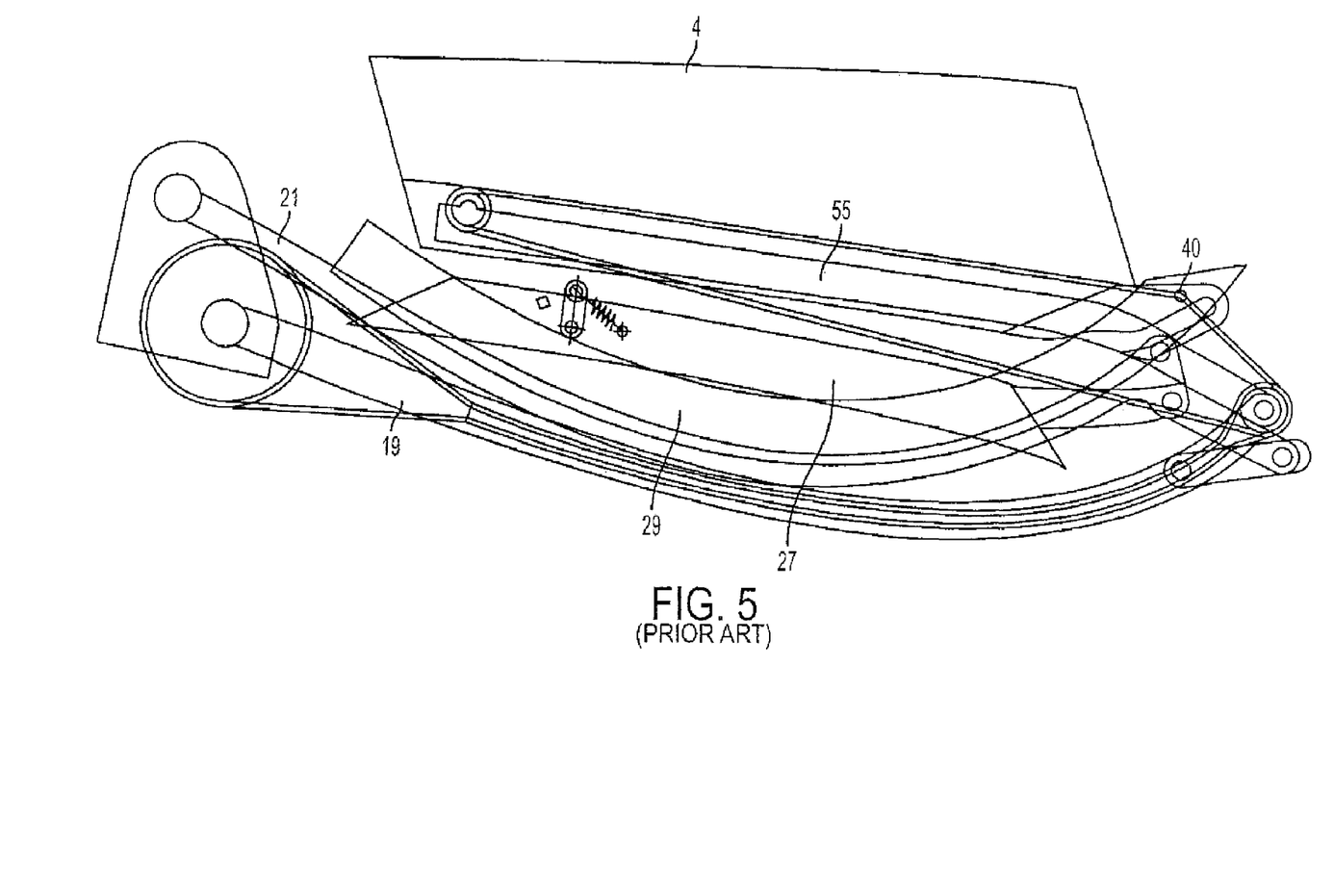
FIG. 5 is a schematic lateral view of the most relevant parts of the mechanism of the motor vehicle covering system according to FIG. 1 in the folded terminal position of the covering system.
Figure 6:
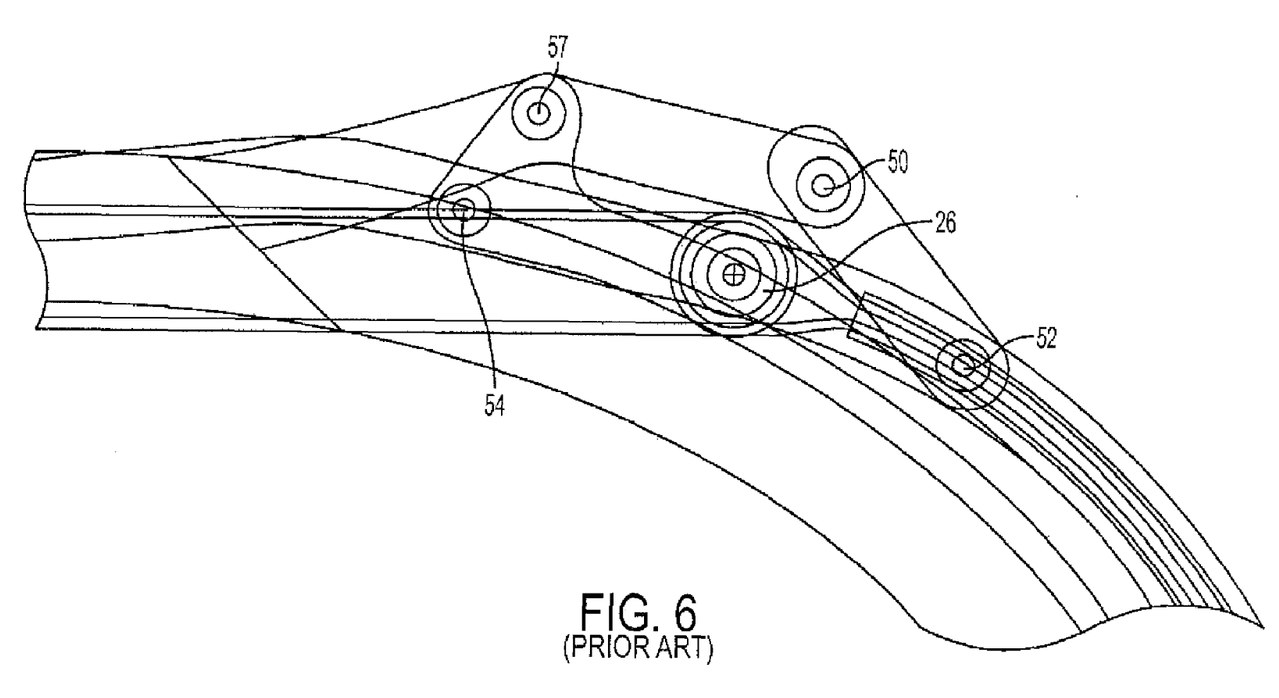
FIG. 6 is a schematic lateral view of the linkage means between third roof section and first as well as second roof section, according to FIG. 1.

The lever mechanism of the covering system can be best explained according to FIG. 3. Rear articulated support rod 19 is linked with center side rail 27 via two levers 41 and 42. Lever 42 is fixed in the upper region of articulated support rod 19 in connection point 52 and extends upwards and slightly towards the tail of the vehicle 9. At the other end, lever 42 is rotationally linked with the slightly angled lever 41 at pivot 50. On its other end, lever 41 is mounted to center side rail 27.

A slightly angled support element 43 comprising a longer leg 55 for the linear shifting movement of the first roof section 3, is hinged to the upper end of support rod 19 with its shorter leg 56 in pivot 51. Articulated support rod 21 is at its upper end also linked to the shorter leg 56 in pivot 54 and to the center of lever 41 in pivot 57.

According to FIGS. 2 to 5, the individual stages of opening the motor vehicle covering system 1 are described below. First, the support rods 19, 21 of the third, rear roof section 7 are pivoted toward the rear driven by a motor. Due to the mechanical lever arrangement, the side rails 25 and 27 are lifted away from the side windows 15 and 16, while the first roof section 3 is pivoted farther upward guided by the upper leg of the linking element 38 in the hook 34. During this procedure, it moves up until it is positioned above the level of the top of the second roof section 5. Simultaneously, the roll 24 is driven, resulting in a corresponding movement of cable 14, roll 26, cable 18 and, via fixing point 40, a pulling force on the first roof section 3 towards the rear.

Figure 7:
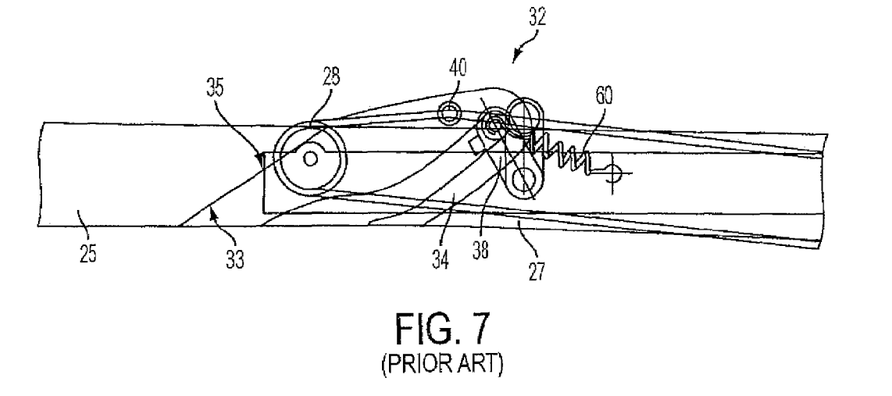
FIG. 7 is a schematic lateral view of the linkage means between the first and the second roof section in a closed position of the motor vehicle covering system according to FIG. 1.
Figure 8:
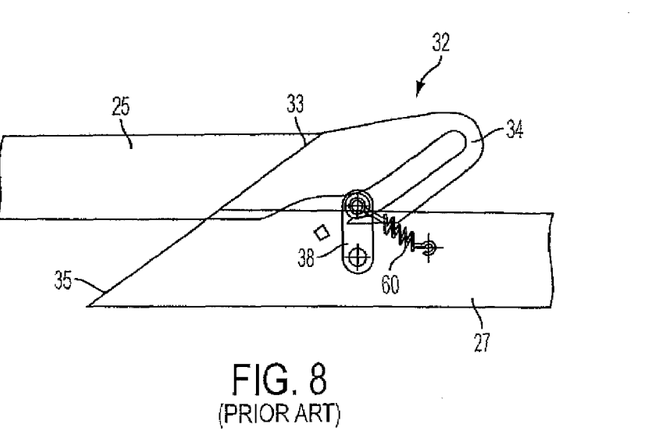
FIG. 8 is a schematic lateral view of the linkage means between the first and the second roof section when the first roof section has been partly lifted up over the second roof section according to FIG. 1.

From FIGS. 7 and 8 it is apparent that the lower end of the linking element 38 is rotationally hinged to supporting frame element 27, while its upper vertical leg is inserted in the hook and is provided with a spring 60 that pulls the upper leg backwards. Therefore, during the first steps of the opening mechanism when the first roof section 3 is lifted up, the lower leg of the linking element 38 moves into vertical position, where it is held by any suitable means. When the covering system is closed again, the hook 34 encloses the vertical leg and pulls it down against the power of the spring 60.

When the third roof section 7 is moved farther backward, the first roof section 3 moves backward, following the guidance of the longer leg 55 of support element 43 by means of the rotation of cable 18. Simultaneously, the first and the second roof sections fold in a flexible manner around a moving swiveling axis in the region of the upper ends of support rods 19, 21 in direction of the front of the vehicle.

Finally, the third, rear roof section 7 is deposited upside down in a bottom of the tail of the vehicle and the first, front roof section 3 is deposited together with the second, central roof section 5 onto the third, rear roof section 7. In this folded terminal position the roof sections are stacked over one another in a configuration in which the second, central roof section 5 is sandwiched between the first, front roof section 3 and the third, rear roof section 7.

The articulating mechanism of the present invention will now be described as it is integrated into a convertible topstack, such as the one just described above. Similar elements are identified with the same reference number and the addition of a ' (prime) sign to indicate how they may integrate into an existing topstack design.

Figure 9:
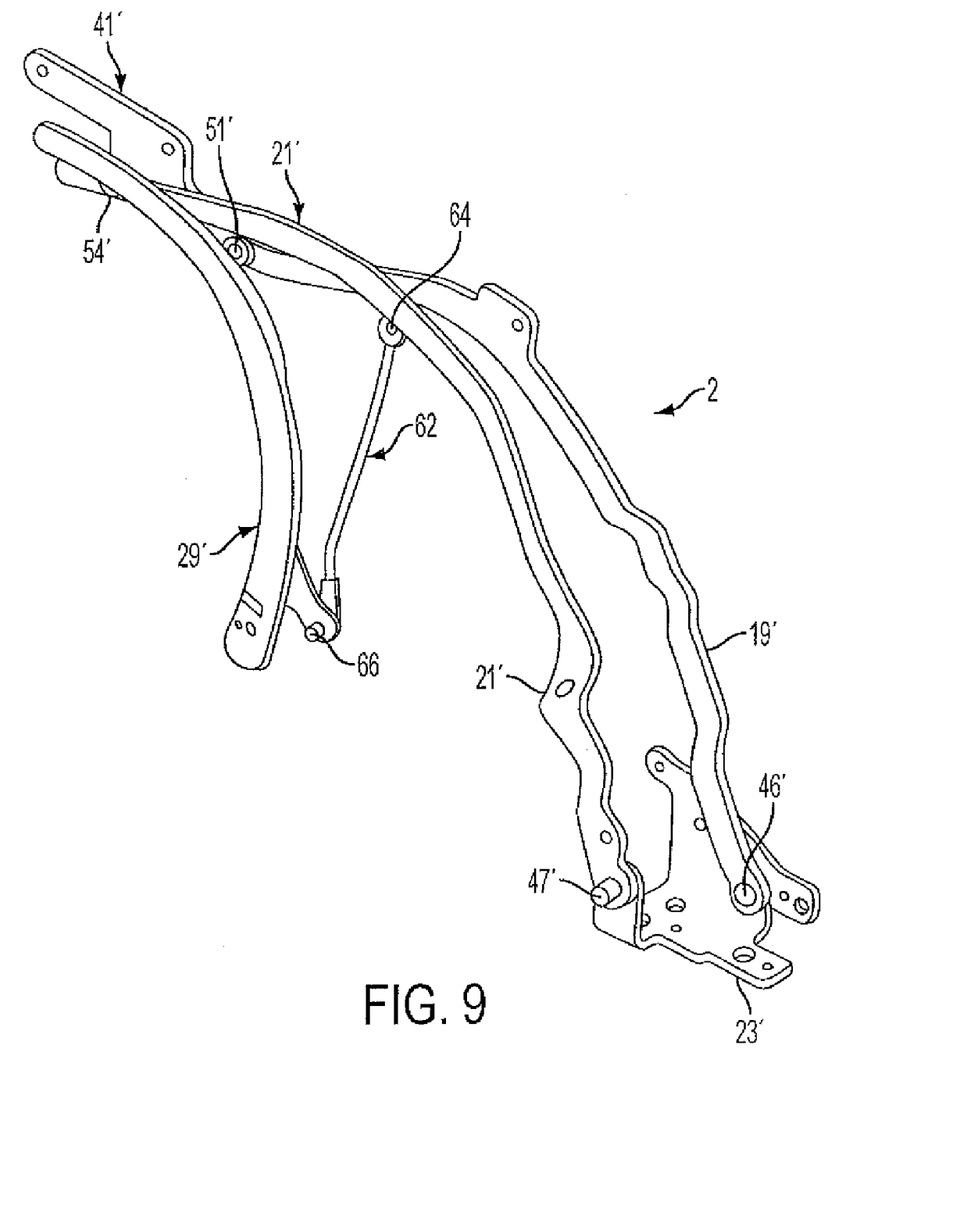
FIG. 9 is a side view of the inwardly articulating linkage mechanism according to the present invention when the convertible top is fully extended.
Figure 12:
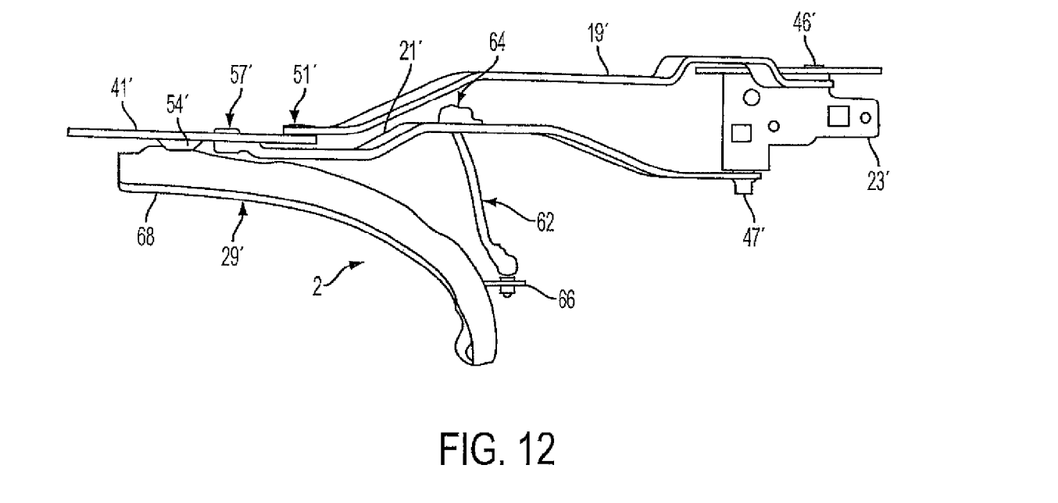
FIG. 12 is a top view of the inwardly articulating linkage mechanism according to the present invention when the convertible top is fully extended.

As shown in a fully extended position in FIG. 9, the articulating mechanism 2 for adjusting the convertible top footprint width from a narrower to a wider dimension upon extending the topstack is a three-dimensional, four bar linkage which includes a front articulated support rod 21' and a rear outer side rail 29'. The inner 21' and outer 19' support rods are hinged to the legs of a preferably U-shaped bearing bracket 23' at pivots 47' and 46' respectively. At the upper end the support rods, 21' and 19', are attached to a preferably Z-shaped bracket 41' at hinge points 57' and 51' respectively. The Z-shaped bracket may be a rear portion of central supporting frame element or side rail link 27 or of a front supporting frame element or side rail link 25 (for a two-seat convertible). See reference numerals for the top stack configuration in FIG. 1. The four bar linkage thus includes front support rod 21', rear outer side rail 29', drag link 62 and Z-shaped bracket 41' (or forward side rail 25 or 27). To create a four bar linkage having a three-dimensional component, that is one of the elements may extend laterally while being articulated longitudinally, the upper end of the rear outer side rail 29' is hinged obliquely to the Z-shaped bracket 41' (or another more forward side rail linkages 25, 27) at joint 54'. As best shown in FIG. 12, hinged obliquely refers to the contact angle of the bearing surfaces of the rear outer side rail 29' and the Z-bracket 41, at pivot 54'. Rather than the surface 68 of the pivot point 54' being parallel to the main longitudinal surface of the bracket 41', the surface 68 protrudes at an oblique angle (i.e., neither parallel or perpendicular) to urge the rear outer rail 29' to arc outwardly in a third plane as the convertible top and articulating mechanisms are extended. The in and out displacement of this element 29' is controlled by a drag link 62 which is attached at an upper end to front support rod 21' at hinge joint 64 and at a lower end to rear outer side rail 29' at ball/rotary joint 66. Accordingly, in the broad context of the present invention, ball joint is defined as any joint which allows for rotary action or movement. The hinge joint 64 operates at approximately 90° to the axis of rotation of joint 54'.

Figure 10:
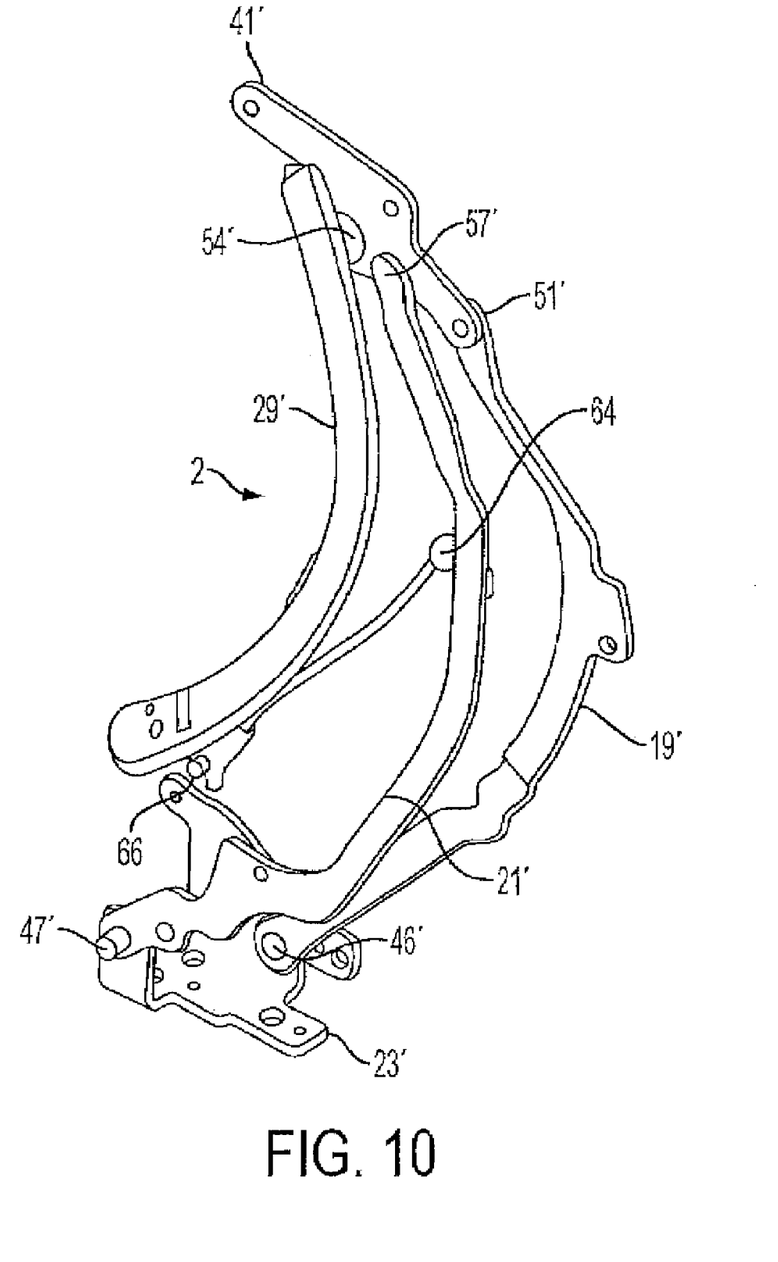
FIG. 10 is a side view of the inwardly articulating linkage mechanism according to the present invention when the convertible top is partially retracted.

FIG. 10 illustrates the three-dimensional, four bar mechanism 2 in a position in which the convertible top (not shown) is partially retracted towards the rear of the convertible 9, in which the articulating members 29', 21' and 19' are rotated rearward and partially collapsed together.

Figure 11:
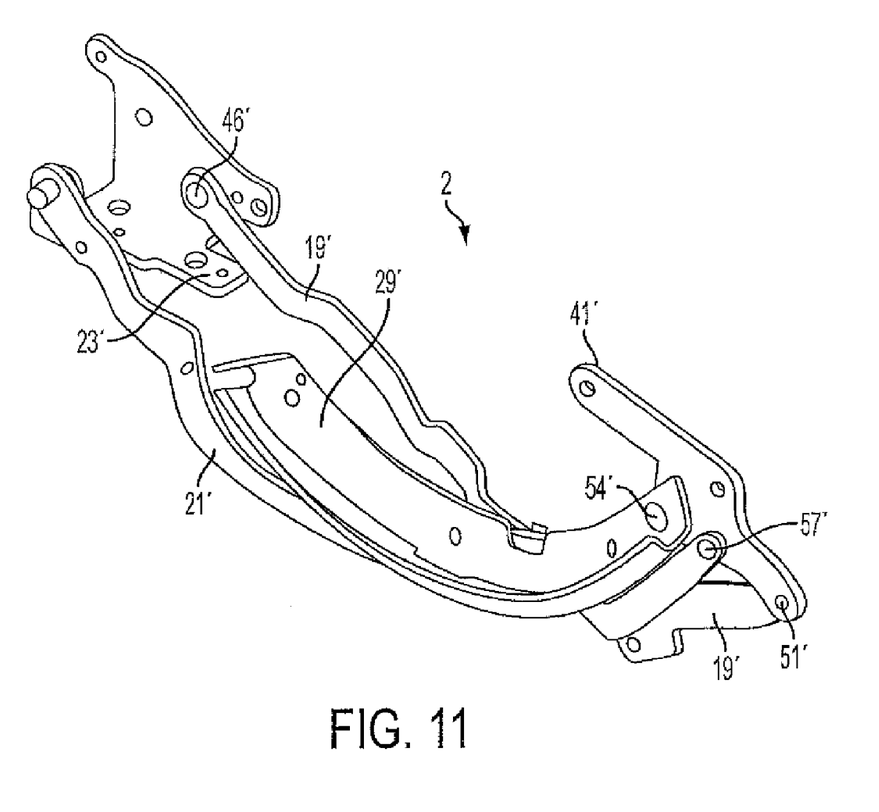
FIG. 11 is a side view of the inwardly articulating linkage mechanism according to the present invention when the convertible top is fully retracted.

FIG. 11 illustrates the mechanism fully collapsed as it would look when lying in a stowed position in a rear space of the convertible 9.

Figure 13:
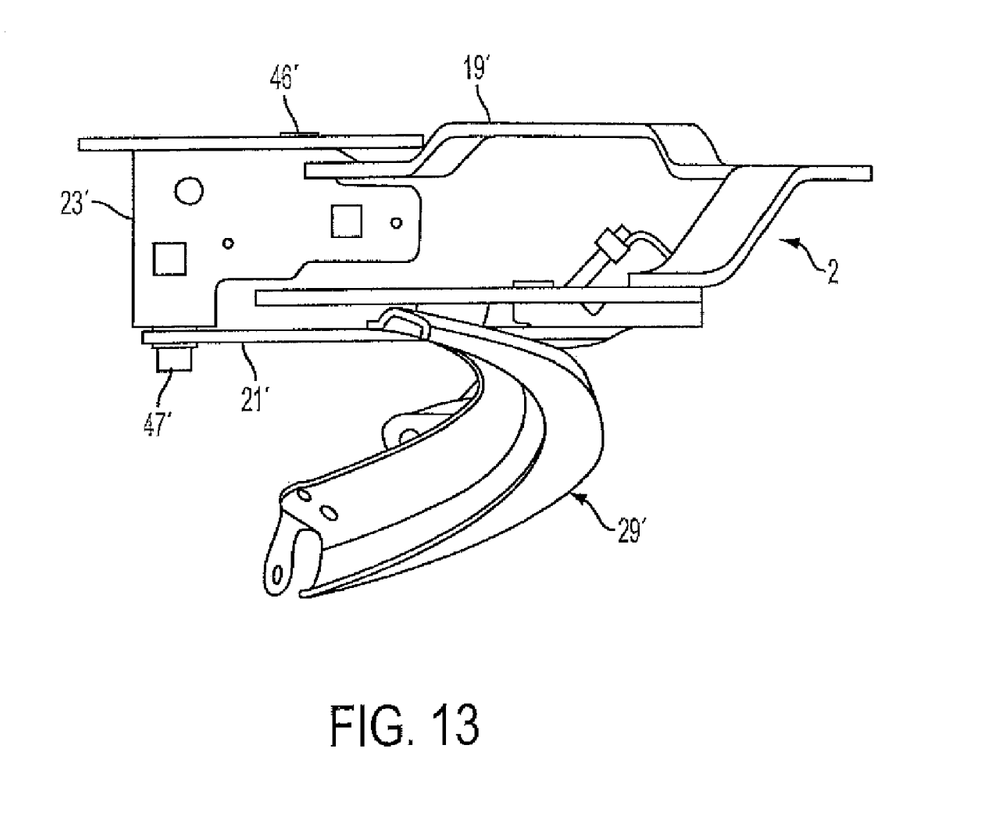
FIG. 13 is a top view of the inwardly articulating linkage mechanism according to the present invention when the convertible top is partially retracted.
Figure 14:
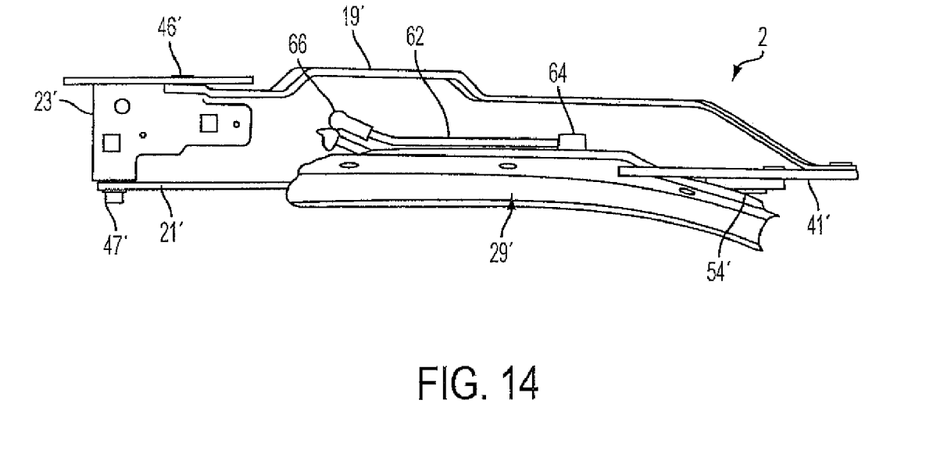
FIG. 14 is a top view of the inwardly articulating linkage mechanism according to the present invention when the convertible top is fully retracted.

A better view of the in and out displacement of the rear outer side rail 29' is seen when comparing FIGS. 12, 13 and 14 which illustrates the mechanism of the present invention in a fully extended (FIG. 12, full outward displacement), partially retracted (FIG. 13), and fully retracted (FIG. 14, full inward displacement) positions.

Comparing FIG. 12 to FIG. 14 it can be seen that a change in width of the rear section of a convertible top of about 6 inches per side may be obtained using the present invention. Since a rear seal and fabric top cover 17 are attached to the rear outer side rail 29', a convertible top which is substantially wider at the rear section than the storage space it will be retracted into may be accommodated via the functioning of the articulating mechanism of the present invention.

Figure 15:
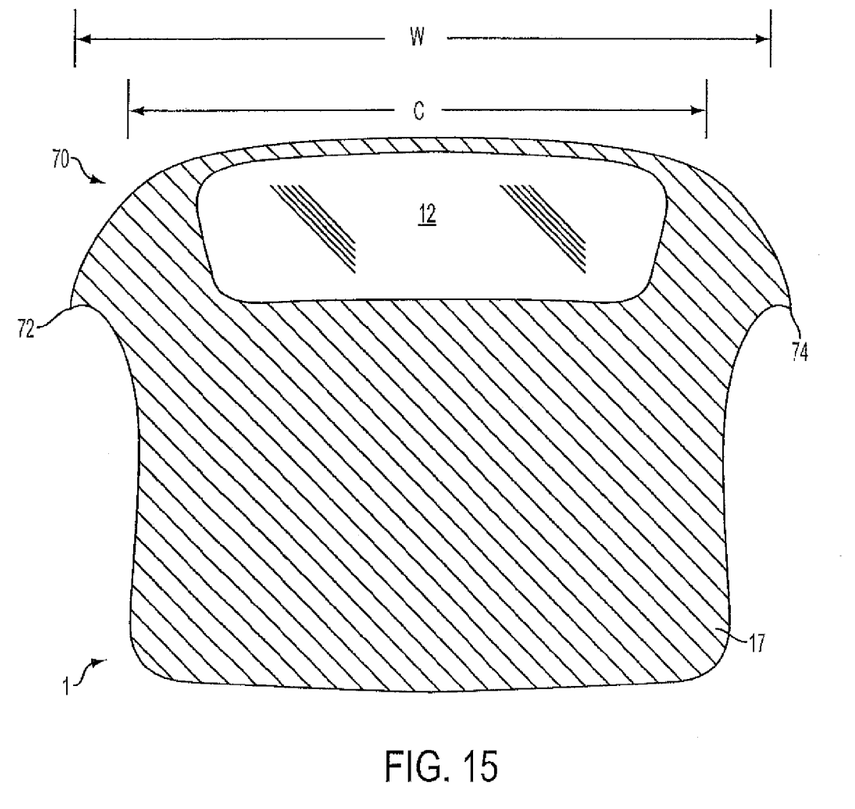
FIG. 15 is a top view of a fabric covered convertible top illustrating the reduced width possible by using the present invention.

FIG. 15 is a top view of a fabric covered convertible top of the present invention illustrating the footprint 70 of the top when extended having a maximum width, W, which is greater than the collapsed width C due to the articulation of the three-dimensional four bar mechanism pulling the rear corners 72, 74 inward when the top is retracted into a storage well.

Thus, it can be appreciated that the present invention provides a convertible top for a number of roof styles for vehicles wherein styling, functionality and packaging may be improved through the use of one or more three-dimensional, four bar linkages which allow the top to be wider in an extended or unfolded condition than in a stored or collapsed or folded condition. In addition, a three-dimensional, four bar linkage is disclosed.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims, one may practice the invention otherwise than as the description and drawings specifically show and describe.

What is claimed is:

1. An operating mechanism for a convertible top for an automobile that has a body including a storage well, said top and said well each having a width, said top being movable between a raised position and a folded position stored within the well; said top having pairs of spaced articulated side linkages interconnected by a plurality of transversely extending spaced apart bows supporting a top cover, each said side linkage including a rear rail pivoted to the body, the operating mechanism including:
  at least one three-dimensional four bar linkage mechanism providing inward and outward movement of said rear rail and said top as said top is folded and raised, the mechanism consisting of:
    a front articulated support rod having an upper end,
    a rear rail having an upper end,
    a drag link having ends, and
    a single Z-shaped bracket engaged to said front articulated support rod and to said rear rail;
  wherein said rear rail is hinged obliquely to said bracket at said upper end, said front articulated support rod is hinged at said upper end to said bracket, and said drag link is hinged at one end to said support rod and attached at the other end to said rear rail via a ball joint.

2. The mechanism of claim 1, wherein the width of said mechanism at its widest point, when raised, is greater than the width of said well.

3. The mechanism of claim 1, wherein the greatest width of said mechanism at its widest point when folded is less than the width of said well.

4. A convertible top for a motor vehicle having a passenger compartment, said top being movable between a hidden position folded within an accommodation chamber and an unfolded position extending from said chamber and covering the passenger compartment, said top comprising a topstack comprising pairs of articulated side linkages interconnected by a plurality of transversely extending spaced apart bows which move relative to each other upon top movement between a folded position and an unfolded position in which said topstack extends over said passenger compartment, and an outer fabric cover covering said bows and said side linkages, said topstack further including at least one rear side rail pivoted to said vehicle and characterized by:
  at least one three-dimensional four bar linkage mechanism providing inward and outward movement of said rear rail and said top as said top is folded and raised, the mechanism consisting of:
    a front articulated support rod having an upper end,
    a rear rail having an upper end,
    a drag link having ends, and
    a single Z-shaped bracket engaged to said front articulated support rod and to said rear rail;
  wherein said rear rail is hinged obliquely to said bracket at said upper end, said front articulated support rod is hinged at said upper end to said bracket, and said drag link is hinged at one end to said support rod and attached at the other end to said rear rail via a ball joint.

5. The mechanism of claim 4, wherein the width of said top at its widest point, when raised, is greater than the width of said well.

6. The mechanism of claim 4, wherein the greatest width of said top at its widest point when folded is less than the width of said well.

7. A convertible top and vehicle in combination, said vehicle having a center line, comprising:
  a right linkage and a left linkage for extending and retracting the convertible top;
  a plurality of transverse bows, each connected to both the right and left linkages;
  a cover supported by the bows and the right and left linkages; each of the right and left linkages including a rear rail pivoted to said vehicle and at least one three-dimensional, four bar linkage mechanism providing inward and outward movement of said rear rail and said top as said top is folded and raised, the mechanism consisting of:
    a front articulated support rod having an upper end,
    a rear rail having an upper end,
    a drag link having ends, and
    a single Z-shaped bracket engaged to said front articulated support rod and to said rear rail;
  wherein said rear rail is hinged obliquely to said bracket at said upper end, said front articulated support rod is hinged at said upper end to said bracket, and said drag link is hinged at one end to said support rod and attached at the other end to said rear rail via a ball joint.

8. The convertible top and vehicle of claim 7, wherein said drag link shifts said rear rail outward with respect to said vehicle center line as the convertible top is extending.

9. A method for opening a vehicle covering system for a convertible, comprising the steps of:
  providing a vehicle having a front and a rear and a passenger space;
  providing a vehicle covering system comprising a topstack having lateral sides and a fabric covering which overlies said passenger space, said topstack including a plurality of paired rail linkages on the lateral sides of said topstack, wherein the linkages on each side are continuous with one another in a closed position of the covering system, and wherein a plurality of transverse members connect said paired linkages;
  providing a three-dimensional, four bar linkage as the rearmost linkage on each side;
  pivoting the pairs of rail linkages with respect to one another such that the covering system is folded and drawn in the direction of the rear of the vehicle
  depositing said folded system, wherein the pairs of linkages nest relative to one another, in the rear of the vehicle;
  wherein said one three-dimensional four bar linkage mechanism provides inward and outward movement of said rear rail and said top as said top is folded and raised, the mechanism consisting of:
    a front articulated support rod having an upper end,
    a rear rail having an upper end,
    a drag link having ends, and
    a single Z-shaped bracket engaged to said front articulated support rod and to said rear rail;
  wherein said rear rail is hinged obliquely to said bracket at said upper end, said front articulated support rod is hinged at said upper end to said bracket, and said drag link is hinged at one end to said support rod and attached at the other end to said rear rail via a ball joint.

* * * * *